(12) United States Patent
Koide et al.

(10) Patent No.: US 8,678,409 B2
(45) Date of Patent: Mar. 25, 2014

(54) SUSPENSION STRUCTURE AND LINK ARRANGING METHOD

(75) Inventors: Reo Koide, Kawasaki (JP); Keiichi Nakajima, Atsugi (JP); Yoshihiro Kawabe, Kamakura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/413,094

(22) Filed: Mar. 6, 2012

(65) Prior Publication Data

US 2012/0292875 A1    Nov. 22, 2012

(30) Foreign Application Priority Data

May 16, 2011  (JP) ................................ 2011-109666

(51) Int. Cl.
*B60G 3/18*    (2006.01)
(52) U.S. Cl.
USPC ........ 280/124.135; 280/124.11; 280/124.144; 280/124.145; 280/124.153; 403/225
(58) Field of Classification Search
USPC ...................... 280/124.153, 124.11, 124.134, 280/124.135, 124.143, 124.144, 124.148; 403/225
See application file for complete search history.

(56) References Cited

U.S. PATENT DOCUMENTS

| | | | |
|---|---|---|---|
| 2,876,018 A * | 3/1959 | Kishline et al. ........ | 280/124.135 |
| 4,139,246 A | 2/1979 | Mikoshiba et al. | |
| 4,480,852 A * | 11/1984 | Rumpel ................. | 280/124.144 |
| 4,491,429 A * | 1/1985 | Matoba et al. ................. | 384/221 |
| 4,720,121 A * | 1/1988 | Kikuchi et al. ........ | 280/124.128 |
| 4,984,928 A * | 1/1991 | Domer .......................... | 403/228 |
| 5,058,867 A | 10/1991 | Hadano et al. | |
| 5,158,320 A | 10/1992 | Ando et al. | |
| 5,439,244 A | 8/1995 | Tomosada et al. | |
| 5,620,261 A | 4/1997 | Salz | |
| 6,099,005 A | 8/2000 | Wakatsuki | |
| 6,817,599 B2 | 11/2004 | Kato et al. | |
| 7,017,890 B2 | 3/2006 | Rechtien | |
| 7,243,934 B2 | 7/2007 | Lee et al. | |
| 7,540,478 B2 | 6/2009 | de Fontenay et al. | |
| 7,789,406 B2 | 9/2010 | Matsuoka | |

(Continued)

FOREIGN PATENT DOCUMENTS

| | | |
|---|---|---|
| DE | 40 41 861 A1 | 7/1991 |
| DE | 43 02 410 A1 | 7/1993 |

(Continued)

OTHER PUBLICATIONS

U.S. Appl. No. 13/413,070, filed Mar. 6, 2012, Koide et al.

(Continued)

*Primary Examiner* — Paul N Dickson
*Assistant Examiner* — Laura Freedman
(74) *Attorney, Agent, or Firm* — Foley & Lardner LLP

(57) ABSTRACT

A suspension structure includes lower front and rear links arranged to connect a wheel support member to support a wheel and a vehicle body member swingably, and an upper link located above the lower front link and arranged to connect the wheel support member and the vehicle body swingably. There is further provided a connect bush arranged to connect the lower front link and the lower rear link with each other. The connect bush is located below a connection point between the lower front link and the wheel support member.

7 Claims, 16 Drawing Sheets

(56) References Cited

U.S. PATENT DOCUMENTS

| | | | |
|---|---|---|---|
| 7,866,640 B2 | 1/2011 | Funano et al. | |
| 8,056,912 B2 | 11/2011 | Kawabe et al. | |
| 8,087,682 B2 * | 1/2012 | Natsukari et al. | 280/124.143 |
| 8,205,900 B1 * | 6/2012 | Moravy et al. | 280/124.138 |
| 8,342,542 B2 * | 1/2013 | Sagara et al. | 280/5.524 |
| 2004/0108640 A1 | 6/2004 | Michael et al. | |
| 2007/0258671 A1 | 11/2007 | Siemer et al. | |
| 2008/0246243 A1 | 10/2008 | Matsuoka | |
| 2009/0289399 A1 | 11/2009 | Suzuki | |
| 2010/0001486 A1 | 1/2010 | Natsukari et al. | |
| 2010/0078911 A1 | 4/2010 | Kawabe et al. | |
| 2010/0201086 A1 | 8/2010 | Sagara et al. | |
| 2012/0292872 A1 * | 11/2012 | Koide et al. | 280/124.108 |
| 2012/0292873 A1 * | 11/2012 | Koide et al. | 280/124.109 |
| 2012/0292876 A1 * | 11/2012 | Koide et al. | 280/124.179 |

FOREIGN PATENT DOCUMENTS

| | | | |
|---|---|---|---|
| EP | 0 698 743 | A2 | 2/1996 |
| FR | 2691767 | A1 | 12/1993 |
| FR | 2863206 | A1 | 6/2005 |
| JP | 01-166146 | U | 11/1989 |
| JP | 07-246816 | A | 9/1995 |
| JP | 09-315122 | A | 12/1997 |
| JP | 2005-505734 | A | 2/2005 |
| JP | 2008-155702 | A | 7/2008 |
| JP | 2008-247069 | A | 10/2008 |
| JP | 2008-247182 | A | 10/2008 |
| JP | 2008-254568 | A | 10/2008 |
| JP | 2008-254569 | A | 10/2008 |
| JP | 2008-254570 | A | 10/2008 |
| JP | 2008-254571 | A | 10/2008 |
| JP | 2008-273401 | A | 11/2008 |
| JP | 2008-273402 | A | 11/2008 |
| JP | 2009-6929 | A | 1/2009 |
| JP | 2009-40292 | A | 2/2009 |
| JP | 2009-126206 | A | 6/2009 |
| JP | 2009-179250 | A | 8/2009 |
| JP | 2009-214743 | A | 9/2009 |
| WO | WO-2007/097070 | A1 | 8/2007 |

OTHER PUBLICATIONS

U.S. Appl. No. 13/412,903, filed Mar. 6, 2012, Koide et al.
U.S. Appl. No. 13/412,935, filed Mar. 6, 2012, Koide et al.
USPTO Office Action, U.S. Appl. No. 13/413,070, Mar. 26, 2013, 20 pages.
USPTO Notice of Allowance, U.S. Appl. No. 13/413,070, Sep. 3, 2013, 11 pages.

* cited by examiner

FIG.5A
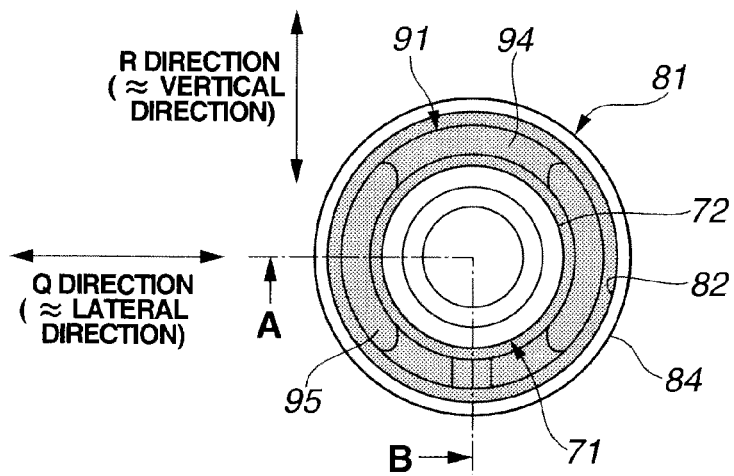
FIG.5D
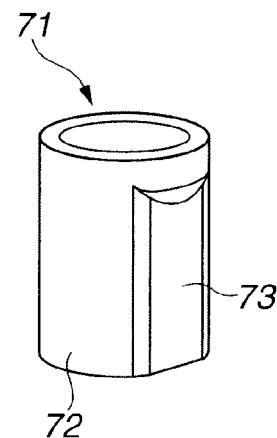
FIG.5B
FIG.5E
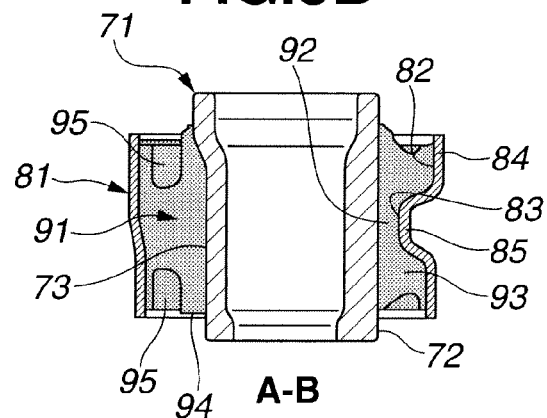
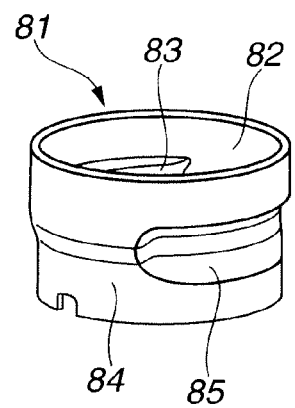
FIG.5C
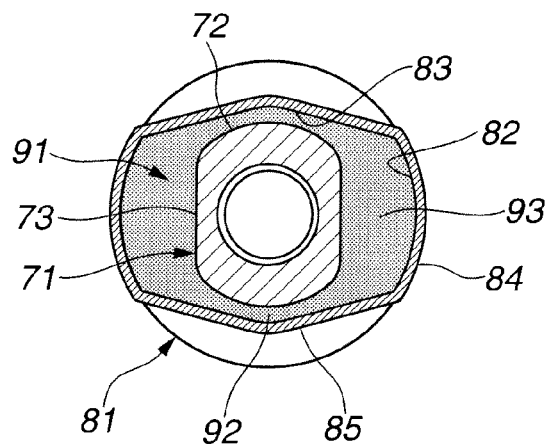

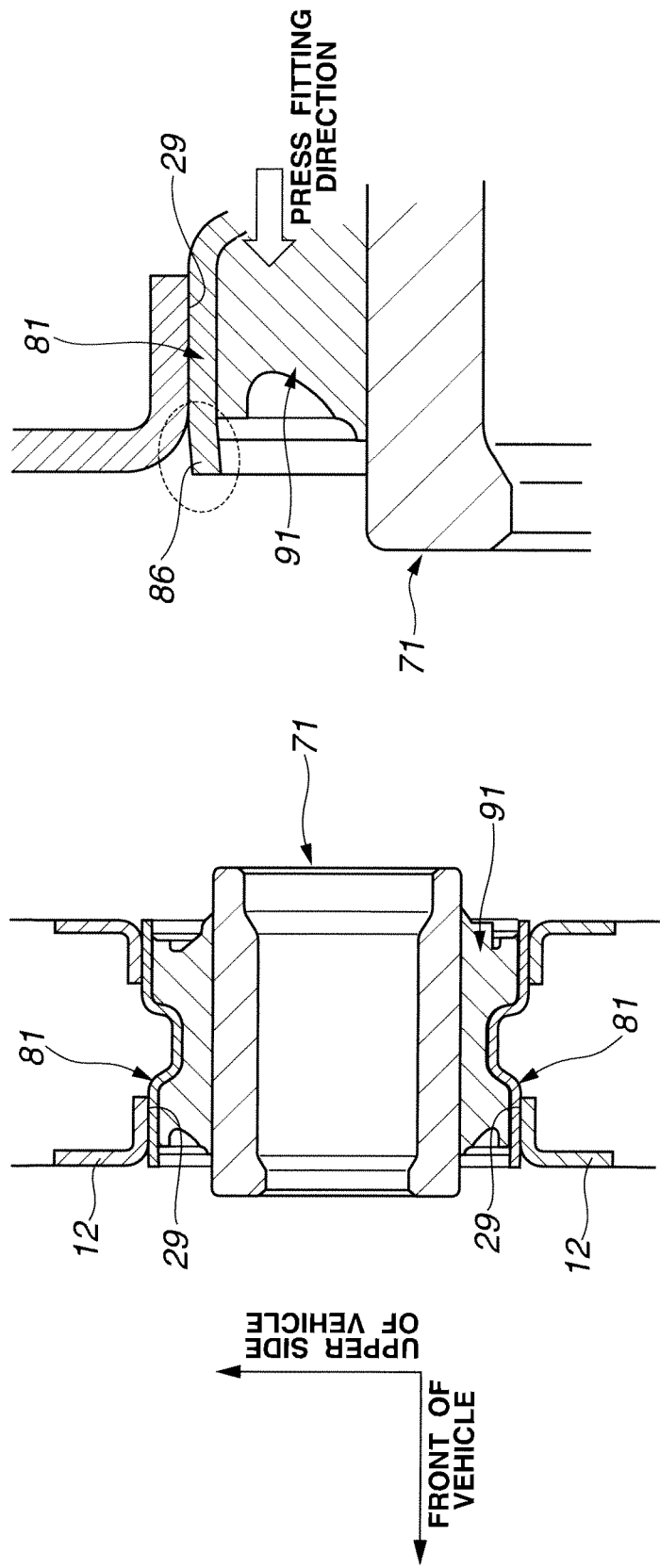

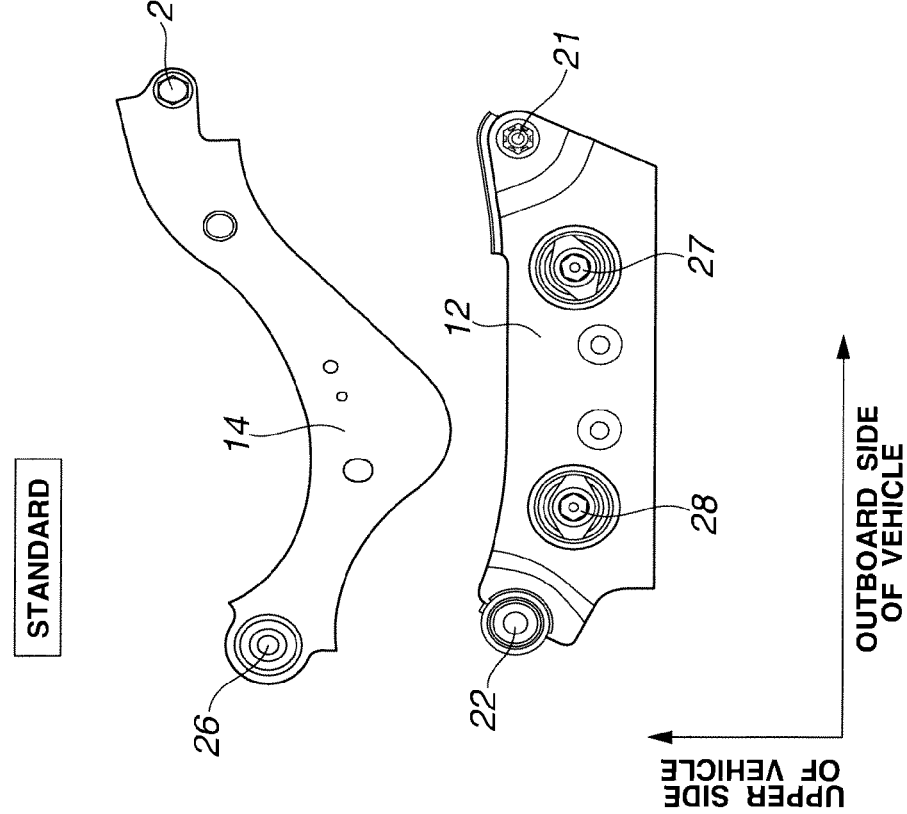

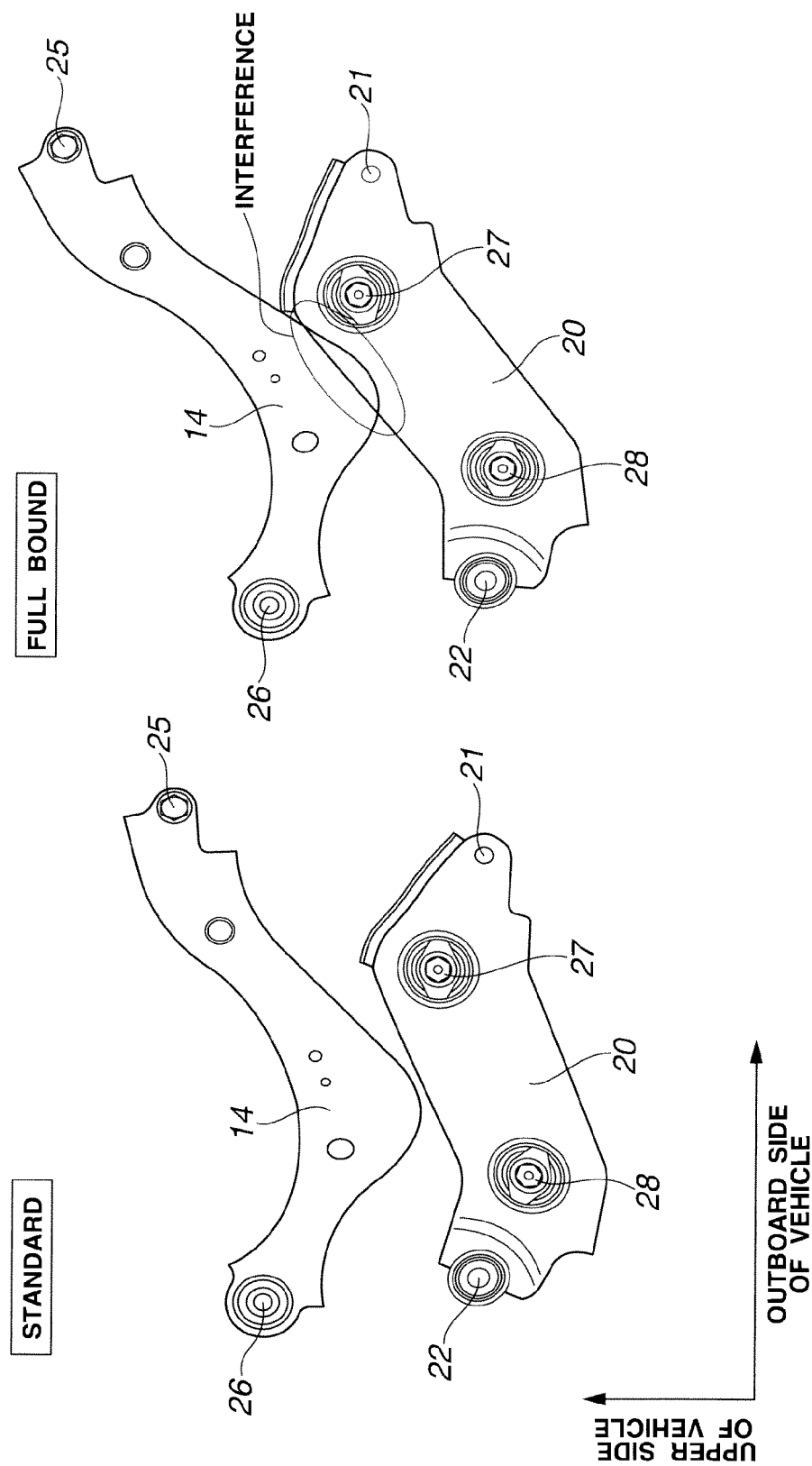

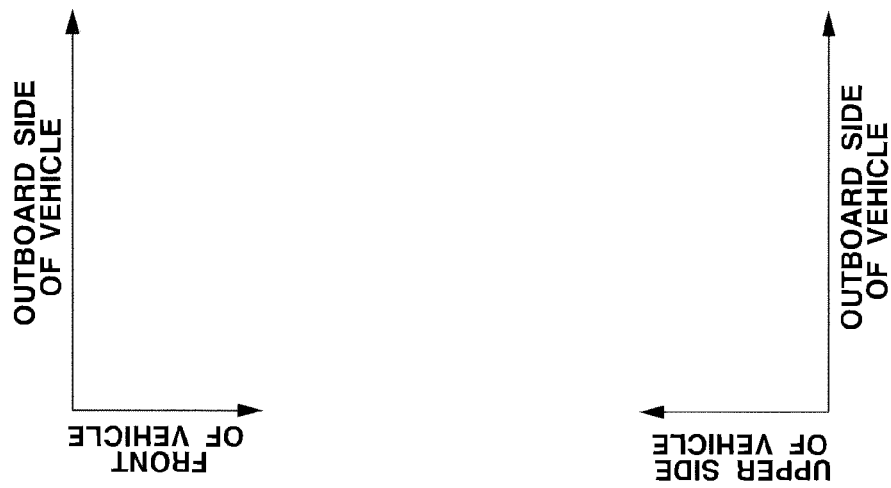
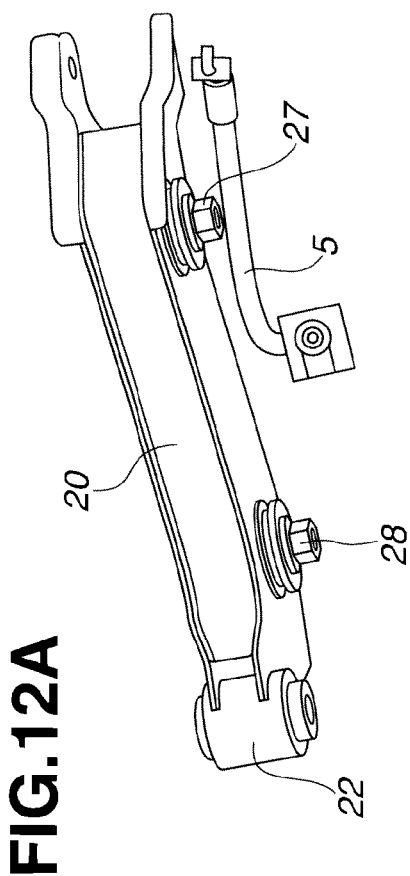
FIG.12A
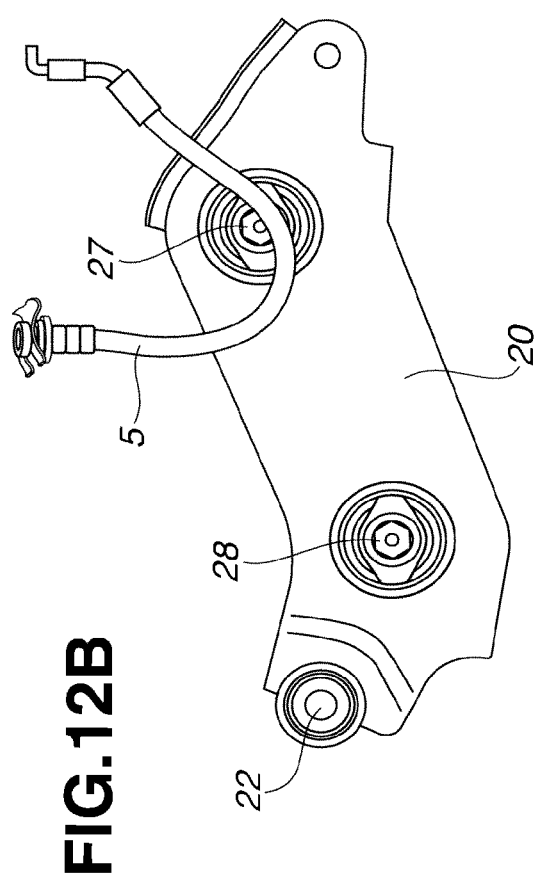
FIG.12B

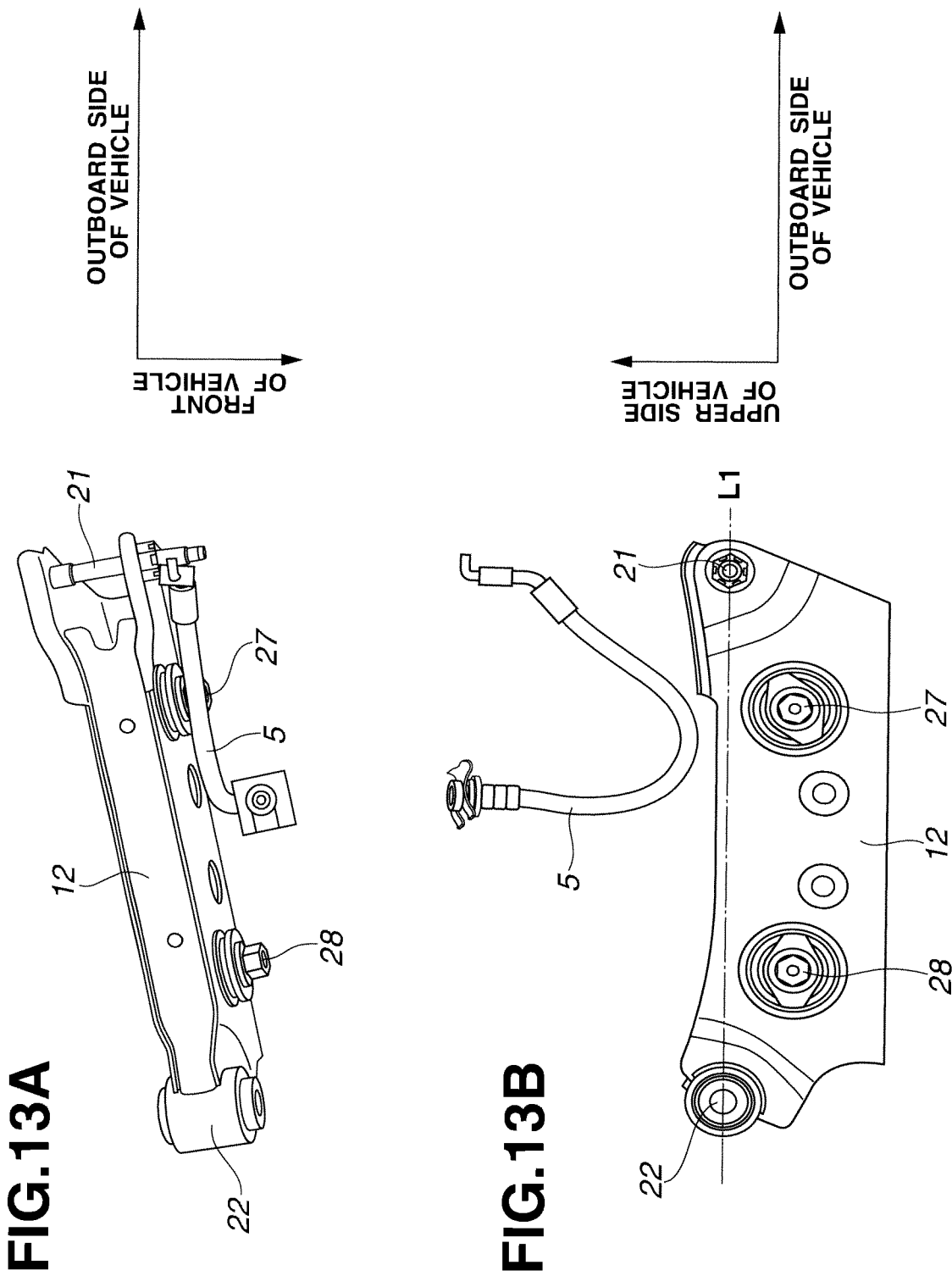

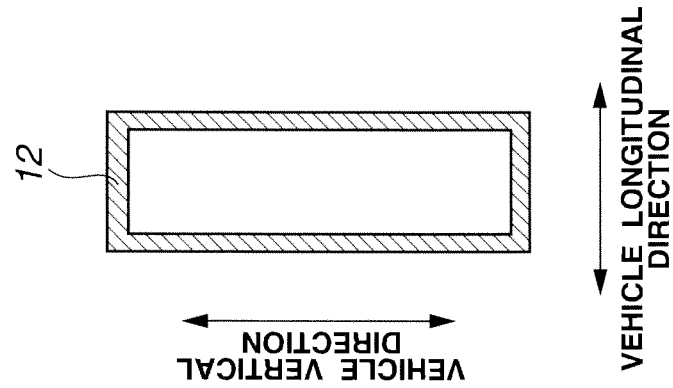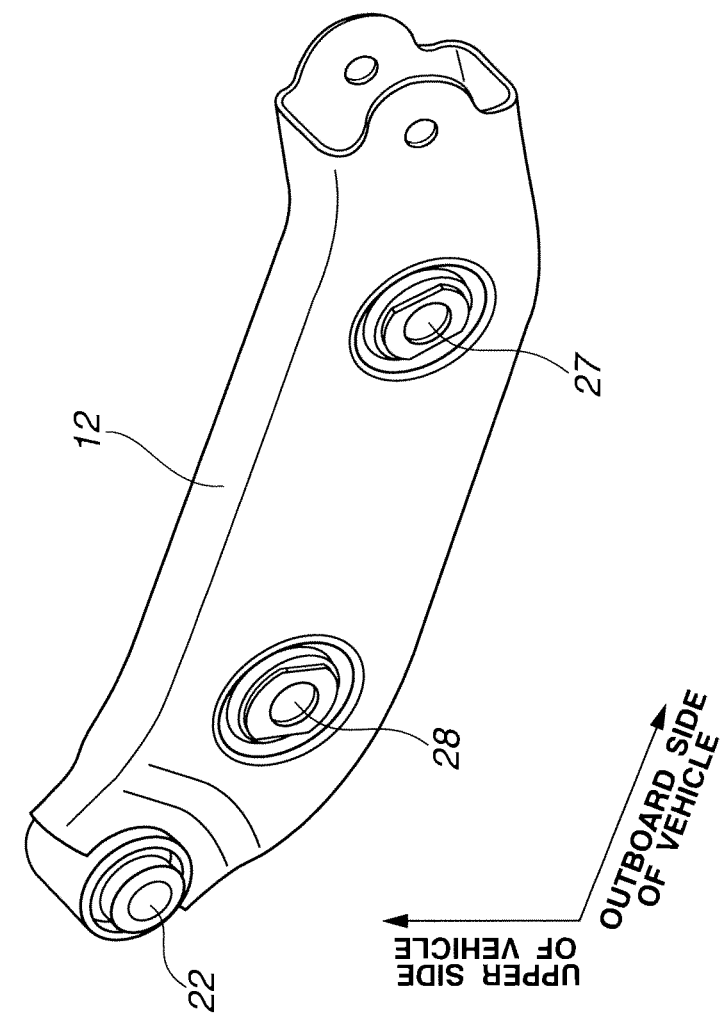

SUSPENSION STRUCTURE AND LINK ARRANGING METHOD

BACKGROUND OF THE INVENTION

The present invention relates to suspension structure and/or suspension link arranging method.

In a suspension system as disclosed in JP2009-214743A, a wheel is connected with a vehicle body by lower and upper links arranged in the vehicle vertical direction.

SUMMARY OF THE INVENTION

In the suspension system as disclosed in the above-mentioned patent document, the upper link has a shape bent downwards to avoid interference with a side member of the vehicle body located above the upper link. Therefore, the upper link might interfere with the lower link, and hence makes it difficult to secure a sufficient amount of the suspension stroke.

Therefore, it is an object of the present invention to restrain interference between suspension links and secure a sufficient amount of the suspension stroke.

According to the present invention, a suspension structure comprises: lower front and rear links arranged to connect a wheel support member adapted to support a wheel and a vehicle body member swingably; an upper link located above the lower front link and arranged to connect the wheel support member and the vehicle body swingably; and a connect bush arranged to connect the lower front link and the lower rear link with each other, the connect bush being located below a connection point between the lower front link and the wheel support member.

BRIEF DESCRIPTION OF THE DRAWINGS

FIG. 5 shows a connect bush connecting the lower front and rear links. FIG. 5A is a top view of the connect bush. FIG. 5B is a longitudinal sectional view taken across a line A-B shown in FIG. 5A. FIG. 5C is a cross sectional view cut by a plane to which the axis is perpendicular. FIG. 5D is a perspective view of an inner cylinder of the connect bush, and FIG. 5E is a perspective view of an outer cylinder of the connect bush.

FIG. 7 shows the construction of the lower front link.

FIG. 8 shows the connect bush connected with lower front link. FIG. 8A is a longitudinal sectional view of the connect bush, and FIG. 8B is an enlarged sectional view showing a forward end of the outer cylinder of the connect bush.

FIG. 9 shows the lower front link and upper link in front elevation. FIG. 9A is a front view in the state of the standard vehicle body posture, and FIG. 9B is a front view in a full bound stroke state.

FIG. 10 shows lower front link and upper link in a comparative example. FIG. 10A is a front view in the state of the standard vehicle body posture, and FIG. 10B is a front view in the full bound stroke state.

FIG. 12 shows the positional relationship of the lower front link and a brake hose shown in FIG. 11 in the comparative example. FIG. 12A is a perspective view of the lower front link as viewed approximately from above, and FIG. 12B is a perspective view of the lower front link as viewed approximately from the front side.

FIG. 13 shows the positional relationship of the lower front link and the brake hose in the example according to the embodiment. FIG. 13A is a perspective view of the lower front link as viewed approximately from above, and FIG. 13B is a perspective view of the lower front link as viewed approximately from the front side.

FIG. 14 shows a variation example 1 of the lower front link.

FIG. 15 shows a variation example 2 of the lower front link. FIG. 15A is a perspective view of the lower front link, and FIG. 15B is a sectional view.

DETAILED DESCRIPTION OF THE INVENTION

Figure 1:
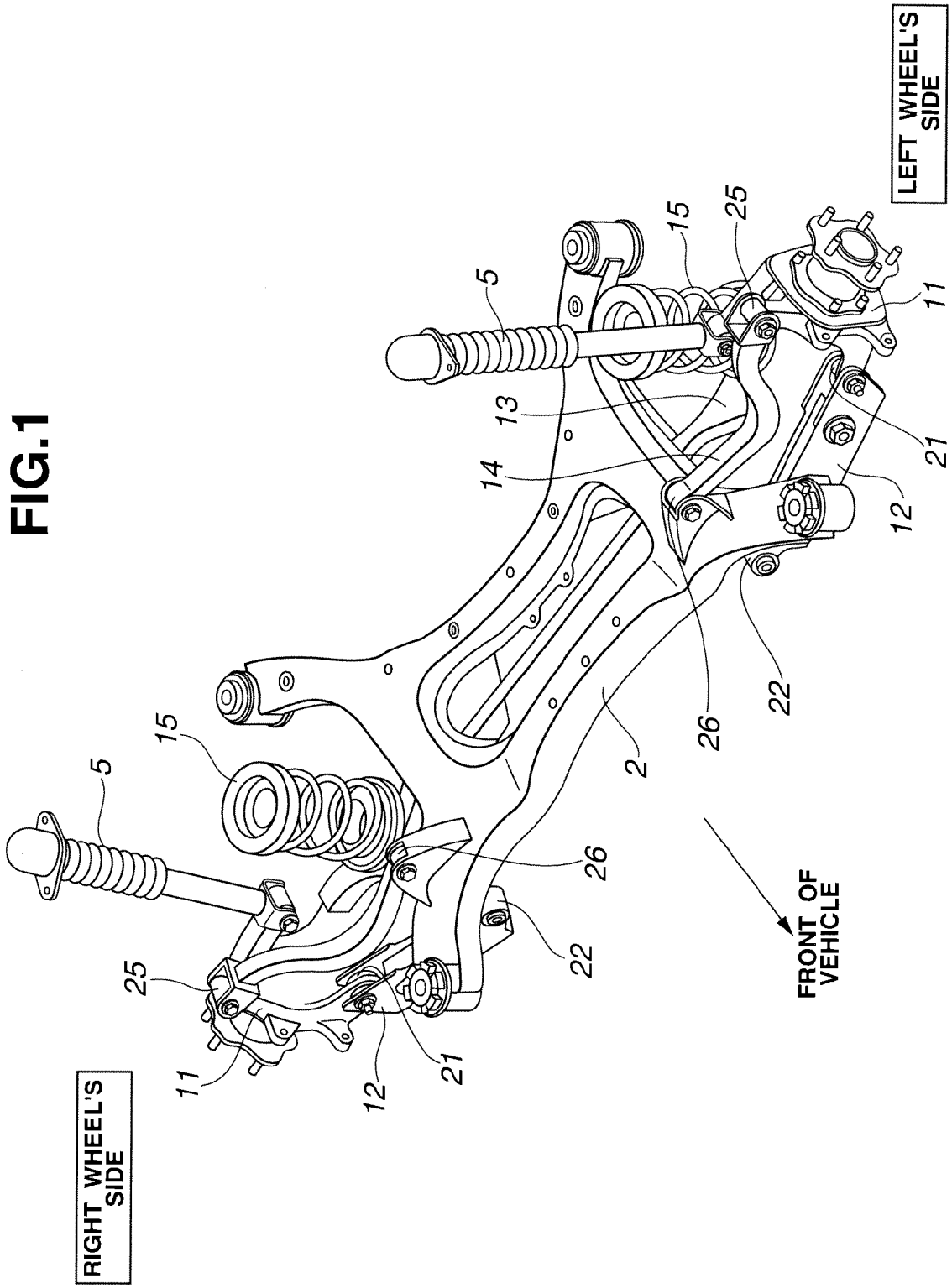
FIG. 1 is a perspective view schematically showing a rear wheel suspension system according to one embodiment of the present invention.
Figure 2:
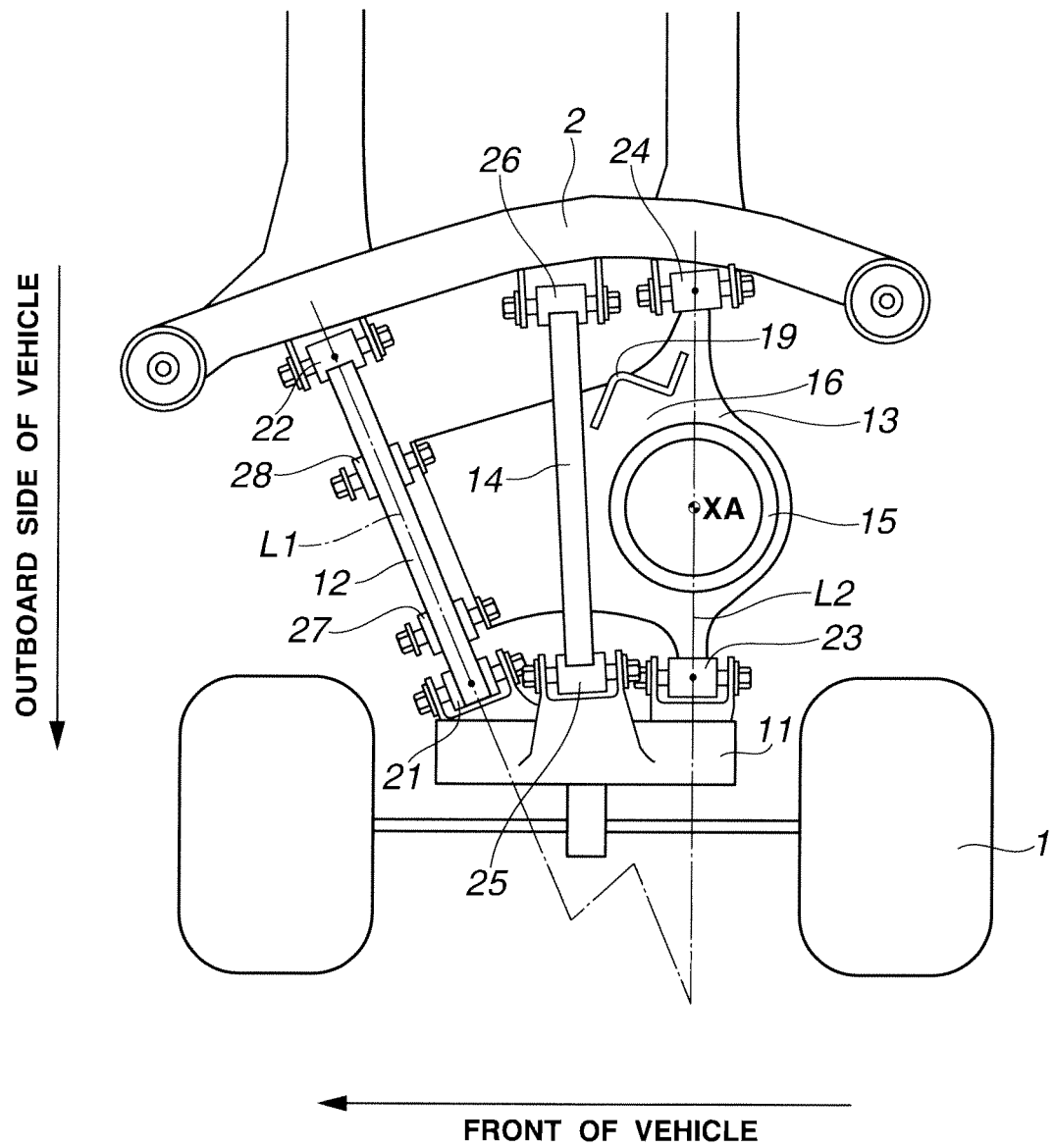
FIG. 2 is a top view schematically showing a rear left wheel suspension system.
Figure 3:
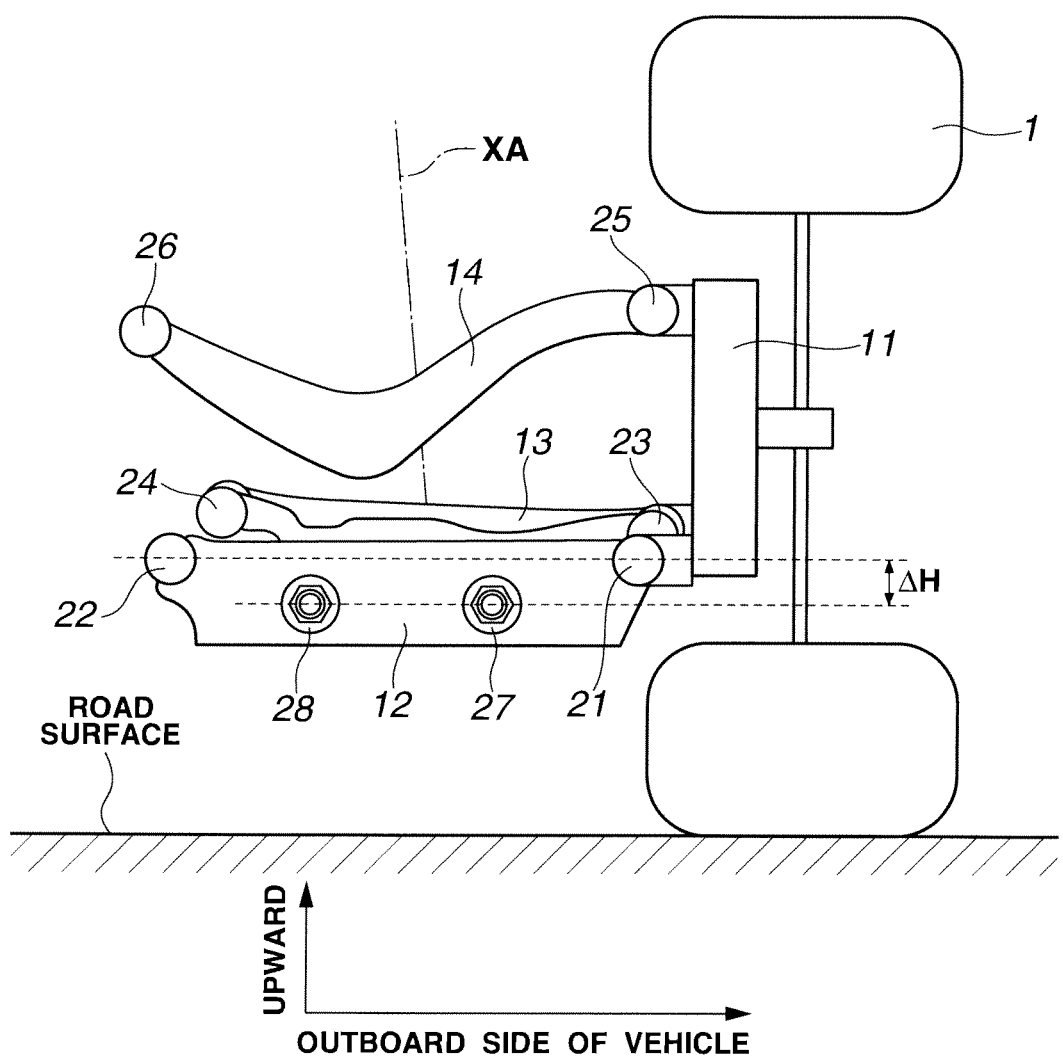
FIG. 3 is a front view schematically showing the rear left wheel suspension system.

The following is explanation on a vehicle such as motor vehicle according to an embodiment of the present invention, with reference to drawings. FIG. 1 is a perspective view schematically showing a rear wheel suspension system in perspective. FIG. 2 is schematic top view schematically showing a rear left wheel suspension system. FIG. 3 is a schematic front view schematically showing the rear left wheel suspension system.

In the illustrated example of this embodiment, a rear left wheel independent suspension system or structure is taken as an example. The suspension system shown in FIGS. 2 and 3 connects a wheel 1 to a suspension member 2 (vehicle body member) of a vehicle body, and includes an axle housing 11 (hub carrier) (wheel support member), a lower front link 12 (front suspension link), a lower rear link 13 (rear suspension link), an upper link 14, a coil spring 15 and a strut 5 (shown in FIG. 1). Axle housing 11 is a wheel support member supporting the wheel 1 rotatably.

The front and lower rear links 12 and 13 are arranged in a front and rear direction (of the suspension system) corresponding to the vehicle longitudinal direction, at approximately equal heights (in the vertical, or up and down, direction corresponding to the vehicle vertical direction). Lower front link 12 extends substantially or approximately in a transverse direction (of the suspension system) (corresponding to the vehicle widthwise or lateral direction) from an outboard end (on the outboard side remoter from the center line of the vehicle) to an inboard end (on the inboard side closer to the vehicle center line). The outboard end of lower front link 12 is connected, through a bush 21 (front outboard link bush), swingably with a lower front portion of the axle housing 11. The inboard end of lower front link 12 is connected, through a bush 22 (front inboard link bush), swingably with a lower front portion of the suspension member 2. In the plan view (as shown in FIG. 2), the connection point on the outboard side (the position of bush 21) is located slightly on the rear side of the connection point on the inboard side (the position of bush 22) in the front and rear direction or in the vehicle longitudinal direction.

Lower rear link 13 extends substantially in the transverse direction (corresponding to the vehicle lateral direction) from an outboard end (on the outboard side) to an inboard end (on the inboard side). The outboard end of lower rear link 13 is connected through a bush 23 (rear outboard link bush) swingably with a lower rear portion of the axle housing 11. The inboard end of lower rear link 13 is connected through a bush 24 (rear inboard link bush) swingably with a lower rear portion of the suspension member 2. In the plan view (as shown in FIG. 2), the connection point on the outboard side (the position of bush 23) and the connection point on the inboard side (the position of bush 24) are located approximately at the same position in the front and rear direction corresponding to the vehicle longitudinal direction.

The distance between the front outboard connection point (the position of bush 21) of lower front link 12 and the rear outboard connection point (the position of bush 23) of lower rear link 13 with respect to axle housing 11 is smaller than the distance between the front inboard connection point (the position of bush 22) of lower front link 12 and the rear inboard connection point (the position of bush 24) of lower rear link 13 with respect to suspension member 2. Therefore, the straight line L1 (the axis or center line of lower front link 12) connecting the positions of outboard bush 21 and inboard bush 22 of lower front link 12 and the straight line L2 (the axis or center line of lower rear link 13) connecting the positions of outboard bush 23 and inboard bush 24 of lower rear link 13 intersect with each other at an intersection point located on the outboard side of the links 12 and 13 (or on the outboard side of the axle housing 11 or the wheel 1). As shown in FIG. 2, the lower rear link 13 extends in the transverse direction or in the vehicle lateral direction whereas the lower front link 12 extends obliquely so that the distance or spacing between the lower front and rear links 12 and 13 in the front and rear direction or the vehicle longitudinal direction becomes gradually smaller in the outboard direction from the inboard ends to the outboard ends of lower front and rear links 12 and 13.

Upper link 14 extends substantially in the transverse direction corresponding to the vehicle lateral direction, from an outboard end (on the outboard side) to an inboard end (on the inboard side) above the lower front and rear links 12 and 13. The outboard end of upper link 14 is connected through a bush 25 (upper outboard link bush) swingably with an upper portion of the axle housing 11. The inboard end of upper link 14 is connected through a bush 26 (upper inboard link bush) swingably with an upper portion of the suspension member 2.

Each of the (link) bushes 21~26 includes an outer cylinder or tube, an inner cylinder or tube nested or inserted in the outer cylinder, and an elastic member made of resilient or elastic material such as rubber interposed radially between the outer and inner cylinders. In this example, all the bushes 21~26 for the lower front link 12, lower rear link 13 and upper link 14 are arranged so that the outer cylinder of each bush is connected with the corresponding end of the link 12, 13 or 14 and the inner cylinder of each bush is connected with the axle housing 11 or suspension member 2.

Lower rear link 13 includes a projecting (plate-like) portion 16 (wing portion) projecting toward the lower front link 12. Projecting portion 16 is an integral part of lower rear link 13. Projecting portion 13 projects forwards in the front and rear direction corresponding to the vehicle longitudinal direction (from the line L2) to a front end. The front end of projecting portion 13 is connected with the lower front link 12 through at least one connect bush allowing predetermined relative displacement. In this example, the front end of projecting portion 13 is connected with the lower front link 12 through connect bushes 27 and 28 allowing predetermined relative displacement. The connect bushes 27 and 28 are arranged along lower front link 12. Each of connect bushes 27 and 28 includes an outer cylinder or tube, an inner cylinder or tube nested or inserted in the outer cylinder, and an elastic member made of resilient or elastic material such as rubber interposed radially between the outer and inner cylinders. In this example, the connect bushes 27 and 28 are arranged so that the axis of the bush extends substantially in the front and rear direction corresponding to the vehicle longitudinal direction, and the outer cylinder of each bush is connected with the lower front link 12 and the inner cylinder of each bush is connected with the projecting portion 16 of lower rear link 13.

The lower rear link 13 including the projecting portion 16 is capable of displacing relative to lower front link 12 within a movable range (deflection range) of the connect bushes 27 and 28. In this embodiment, each of the connect bushes 27 and 28 is anisotropic in stiffness or rigidity so that the stiffness in the transverse direction (the vehicle lateral direction) is lower than the stiffness in the vertical direction. Connect bushes 27 and 28 will be explained more in detail later.

A toe control is performed at the time of braking in a following manner.

When a rearward force toward the rear of the vehicle body is inputted to wheel 1 by a braking operation or other factors, the axle housing 11 is displaced rearwards to the rear of the vehicle body. In this case, a rearward displacement quantity of the connection point (bush 21) of lower front link 12 with respect to axle housing 11 and a rearward displacement quantity of the connection point (bush 23) of lower rear link 13 with respect to axle housing 11 are substantially equal to each other. However, in the nonparallel arrangement or geometry of straight lines L1 and L2 as mentioned before, an inboard displacement quantity of the connection point (bush 21) of lower front link 12 is greater than an inboard displacement quantity of the connection point (bush 23) of lower rear link 13 in the inboard lateral (or vehicle widthwise) direction toward the center line (longitudinal axis) of the vehicle body. Thus, the front connection point (bush 21) of axle housing 11 is pulled inwards in the inboard lateral direction toward the center line of the vehicle body, and hence a toe change is produced in wheel 1 during braking, in a direction to increase the quantity of toe-in, to the advantage of the stability.

The coil spring 15 is arranged in a following manner. Coil spring 15 is disposed between lower rear link 13 and the vehicle body so that a coil axis XA is substantially vertical in the vertical direction. Coil spring 15 is located so as to overlap the straight line L2 as viewed in the plan view. Preferably, the coil axis XA is located on straight line L2 as shown in FIG. 2, or the coil axis XA intersects the straight line L2. In this example, the coil spring 15 is mounted on lower rear link 13 at a middle or about the middle between the rear outboard connection point (bush 23) and the rear inboard connection point (bush 24). A seating surface of coil spring 15 extends and overlaps the projecting portion 16 of lower rear link 13. Lower rear link 13 includes a rear portion projects rearwards so as to conform with the outside diameter of coil spring 15.

Figure 4:
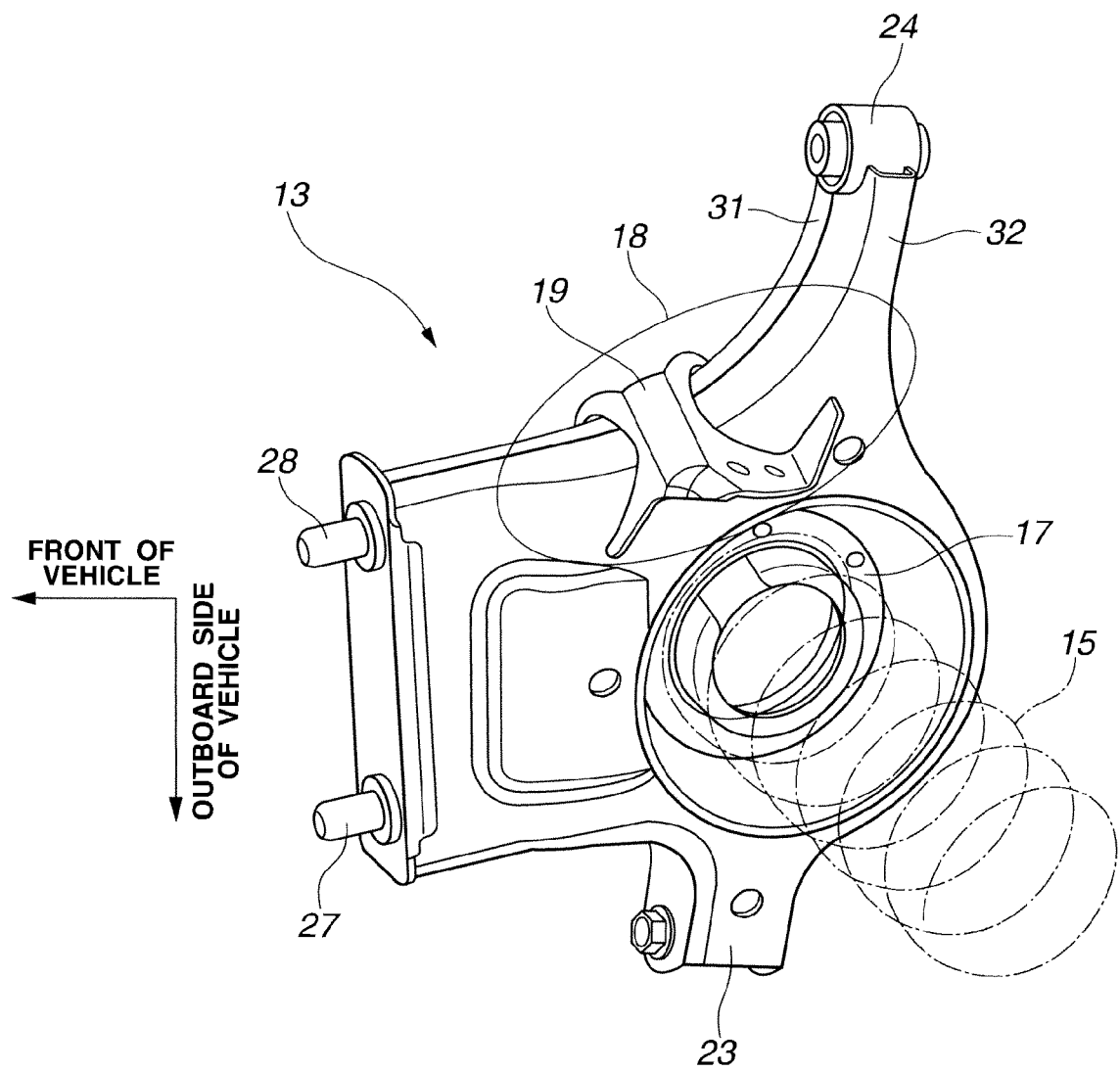
FIG. 4 is an external view of a lower rear link shown in FIG. 2.

Coil spring 15 is connected with lower rear link 13 in a following manner. FIG. 4 is an external view of the lower rear link 13, for showing an assembly structure of lower rear link 13 and coil spring 15. A lower spring seat 17 is interposed between the lower end of coil spring 15 and lower rear link 13. The lower spring seat 17 having an annular shape is installed in the lower rear link 13, and the lower end of coil spring 15 is attached to this lower spring seat 17.

Lower rear link 13 has a hollow structure made up of a lower bracket 31 and an upper bracket 32 which are shaped in a recessed form like a dish or a pan, and which are joined so that the concave sides of the lower and upper brackets 31 and 32 confront each other. Lower and upper brackets 31 and 32 are joined together and united by arc welding.

A curved portion 18 is formed in lower rear link 13. Curved portion 18 is a portion where the cross sectional area is varied sharply from the connection point (bush 24) with suspension member 2, to the inboard connection point (bush 28) with lower front link 12. A reinforcing bracket 19 is attached to the curved portion 18. Reinforcing bracket 19 is arranged to straddle and hold (or clamp) the lower bracket 31 and upper bracket 32. Lower rear link 13 and reinforcing bracket 19 are joined together and united by arc welding.

Lower spring seat 17 is disposed on a concave surface (inside bottom surface) of lower bracket 31. Coil spring 15 extends from the lower end attached to this lower spring seat 17, through an opening formed in upper bracket 32, and projects upwards.

Connect bushes 27 and 28 are constructed in a following manner. Connect bushes 27 and 28 are identical in construction. Accordingly, the following explanation is directed to connect bush 27 only. FIG. 5 shows the connect bush in a single state. FIG. 5A is a top view of connect bush 27. FIG. 5B is a longitudinal sectional view taken across a line A-B shown in FIG. 5A. FIG. 5C is a cross sectional view cut by a plane to which the axis is perpendicular. FIG. 5D is a perspective view of an inner cylinder 71, and FIG. 5E is a perspective view of an outer cylinder 81. Connect bush 27 includes an inner cylinder (or tube) 71 having an axis extending substantially in the vehicle front and rear (or longitudinal) direction, an outer cylinder (or tube) 81 surrounding the inner cylinder 71, and an elastic member 91 interposed (radially) between the inner and outer cylinders 71 and 81. Inner cylinder 71 is connected with the extending portion 16 of lower rear link 13, and outer cylinder 81 is connected with lower front link 12.

The inner and outer cylinders 71 and 81 are arranged coaxially (substantially on the same axis). An outside circumferential (or cylindrical) surface 72 of inner cylinder 71 confronts (radially) an inside circumferential (or cylindrical) surface 82 of outer cylinder 81. Outer cylinder 81 includes a pair of convex portions 83 projecting radially inwards toward the outside circumferential surface 72 of inner cylinder 71, respectively from two positions (diametrically opposite circumferential positions) spaced from each other in the vertical direction (R) (corresponding to the vehicle up and down direction) on the inside circumferential surface 82 of outer cylinder 81. The convex portion 83 are formed at a middle or in a central portion between the two axial ends of outer cylinder 81 extending in the P direction, and the convex portion 83 extends circumferentially approximately in the side direction (Q) (corresponding to the vehicle widthwise lateral direction), in the form of streak like a ridge.

Convex portions 83 are formed by deforming the outer circumferential or cylindrical surface 84 of outer cylinder 81 into a concave form recessed in the vertical direction R (vehicle vertical direction), radially inwards toward the inner cylinder 71. That is, the convex portions 83 are formed by compressing the outer cylinder 81 in the vertical direction R, from both of the diametrically opposite radial outer sides to form compressed portion or concave grooves 85 extending circumferentially like a circular arc and being recessed radially inwards.

With the convex portions 83 of outer cylinder 81, the elastic member 91 is formed with thin wall portions 92 and thick wall portions 93. The thin wall portions 92 are spaced in the vertical direction R at upper and lower (diametrically opposite) positions, and deformed to have a thinner wall thickness. The thick wall portions 93 are spaced in the side (horizontal) direction (Q) at (outboard and inboard) (diametrically opposite) positions, and formed to have a thicker wall thickness greater than the thinner wall thickness of the thin wall portions 92. Therefore, in the compressive deformation in the diametrical direction perpendicular to the axis, the stiffness or rigidity of the thin wall portions 92 is made higher than the stiffness of thick wall portions 93. In other words, the connect bush 27 is stiff (higher elastic force) in the vertical direction R (≈the vehicle vertical direction), and soft (lower elastic force) in the side direction (Q) (≈the vehicle lateral direction). Thus, the connect bush 27 serves as a stiff spring in the vehicle up and down direction and serves as a soft spring in the vehicle lateral direction.

Convex portions 83 is formed in outer cylinder 81 after the elastic member 91 is formed by vulcanization or curing between inner and outer cylinders 71 and 81. In this production method of forming the convex portions 83 in the inside circumferential surface 82 of outer cylinder 81 after the formation of elastic member 91, the portions of elastic member 91 between the outside circumferential surface 72 of inner cylinder 71 and the convex portions 83 of outer cylinder 81 are made dense to have a higher density as compared to the remaining portion, and hence the stiffness in the vertical direction R (≈vehicle up and down or vertical direction) is further increased.

Elastic member 91 extends axially (in the direction P) from one of two axial end surfaces 94 to the other, and each of the axial end surfaces 94 is formed with two hollow portions (or relief portions) 95 (circumferential grooves) at two diametrically opposite positions in the side direction (Q) (substantially identical to the vehicle lateral direction). Each of the hollow portions 95 is in the form of a circumferential groove 95 depressed in the axial direction and extended in the circumferential direction around the axis of elastic ember 91. The circumferential grooves 95 are not so deep as to pierce the elastic member 95. With the circumferential grooves 95, the stiffness of elastic member 91 is decreased in the side direction (Q) corresponding to the vehicle lateral direction.

Inner cylinder 71 includes cut surfaces 73 formed in the outside circumferential surface 72 at two diametrically opposite positions spaced in the side direction (Q) (vehicle lateral direction). The cut surfaces 73 are substantially in the form of two parallel flat planes extending substantially in parallel to the vertical direction R. Cut surfaces 73 extend axially from one of the axial ends of inner cylinder 71, and terminate without reaching the other axial end of inner cylinder 71. With these cut surfaces 73, the radial thickness (the thickness in the radial thickness) of inner cylinder 71 measured in the vertical direction R is smaller than the radial thickness of inner cylinder 71 measured in the side direction (Q) (vehicle lateral direction). Accordingly, the radial thickness of elastic member 91 is increased in the side direction (Q) (vehicle lateral direction) with the outer cylinder 81 having the inside diameter being set constant, and the stiffness of elastic member 91 is decreased in the side direction (Q) (vehicle lateral direction) as compared to a bush structure having no cut surfaces 73.

In the thus-constructed connect bush 27 (or 28), the stiffness in the vertical direction R (vehicle vertical direction) is adjusted by adjusting the radial thickness, the axial width and/or the circumferential length of thin wall portion or portions 92 in elastic member 91, and/or by adjusting the amount of projection, the axial width and/or the length in the side direction (Q), of the convex portion or portions 83. The stiffness in the side direction (Q) (vehicle lateral direction) is adjusted by adjusting the axial depth, the radial width and/or the circumferential length of groove or grooves 95, and/or by adjusting the axial length, the length in the vertical direction R and/or the height (=the distance from the axis) of cut surface or surfaces 73. By adjusting at least one of these factors, it is possible to adjust the stiffness in every angular direction perpendicular to the axis, around the axis.

In the above-mentioned production method of forming the convex portions 83 in inside circumferential surface 82 of outer cylinder 81 after the formation of elastic member 91 by vulcanization between inner and outer cylinders 71 and 81, the two convex portions 83 are to be formed at positions shifted from the positions of the two grooves 95 by 90 degrees in phase. Two grooves 95 and two cut surfaces 73 are arranged in the same angular direction. Therefore, the two convex portion 83 can be formed at the angular position rotated by 90 degrees with respect to the cut surfaces 73.

Therefore, in the operation of forming convex portions 83 in the production process of connect bush 27 (or 28), the connect bush 27 (or 28) is set in a jig (not shown) with reference to the cut surfaces 73. Thus, the cut surfaces 73 are used as means for positioning the connect bush with respect to the jig in the production process of the connect bush.

Figure 6:
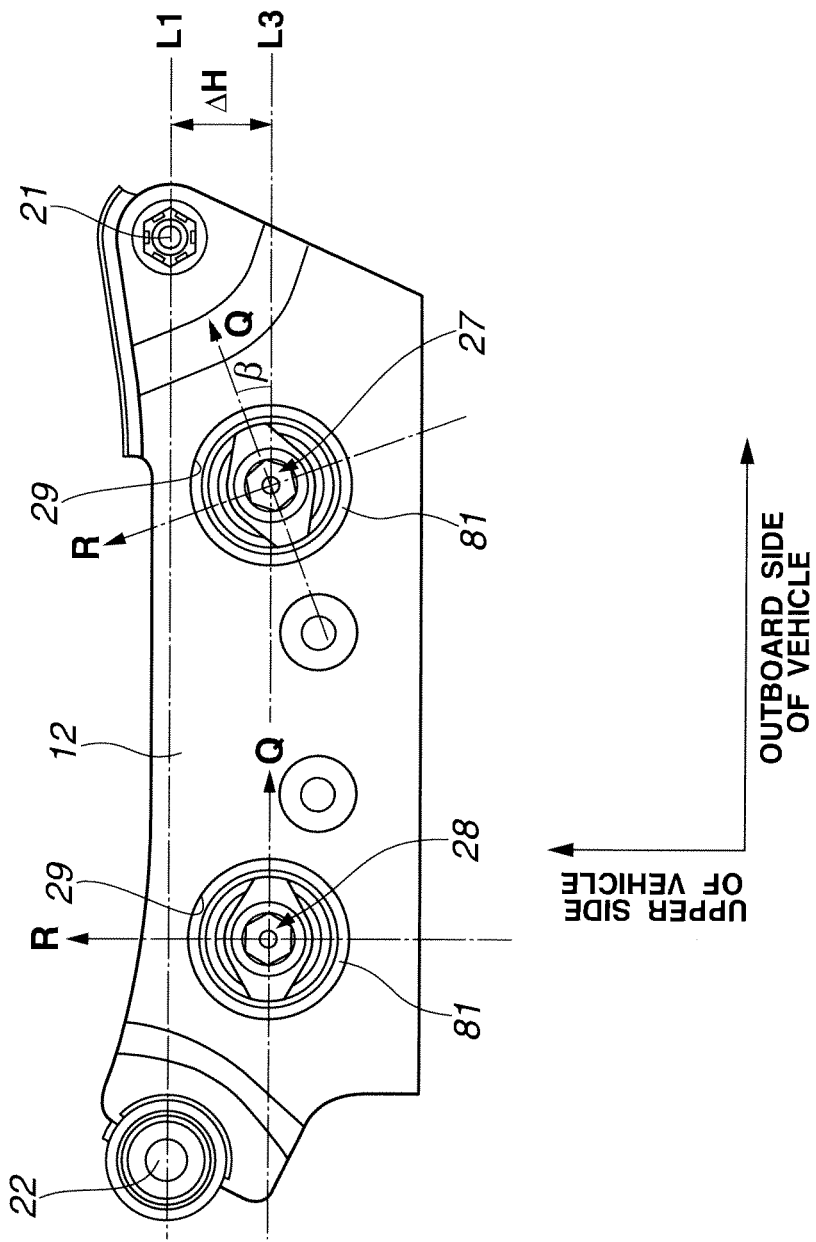
FIG. 6 is a front view showing the connect bushes connected with the lower front link.

FIG. 6 is a front view showing the connect bushes 27 and 28 connected with lower front link 12. In a standard vehicle body posture which is a posture of the vehicle body in which the suspension stroke is zero, the straight line L1 connecting the outboard connection point (bush 21) and the inboard connection point (bush 22) of lower front link 12 extends approximately in the vehicle lateral or widthwise direction (horizontal direction). As viewed in a front view of the vehicle body, the lower front link 12 is in the form a long rectangle extending horizontally. The link bush 21 is disposed at an upper portion of the outboard end of lower front link 12, and the link bush 22 is disposed at an upper portion of the inboard end of lower front link 12, Thus, lower front link 12 includes a lower portion extending below the straight line L1 connecting the outboard connection point (bush 21) and the inboard connection point (bush 22) of lower front link 12.

Connect bushes 27 and 28 are disposed at a level lower by a vertical distance or level difference ΔH than the level of the outboard connection point (bush 21) of lower front link 12. As best shown in FIG. 6, connect bushes 27 and 28 are located at the level which is lower than the straight line L1 connecting the outboard connection point (bush 21) and the inboard connection point (bush 22) of lower front link 12, by vertical distance ΔH. A straight line L3 connecting the connect bushes 27 and 28 with each other is substantially parallel to the straight line L1 connecting the outboard connection point (bush 21) and the inboard connection point (bush 22) of lower front link 12. Line L3 extends along line L1, on the lower side of line L1.

Each of connect bushes 27 and 28 is installed so that a first perpendicular (or radial) direction R perpendicular to the bush axis is a vertical or up-and-down direction, and a second perpendicular (or radial) direction Q perpendicular to the axis and perpendicular to the first perpendicular direction R is a side direction (or horizontal direction). In the illustrated example, the hollow portions 95 confront each other in the second perpendicular direction or side direction Q, and the convex portion 83 (concave portions 85) confront each other in the first perpendicular direction or vertical direction R. In the installed state installed in the vehicle, each of connect bushes 27 and 28 is so oriented that the vertical direction R of the bush extends approximately in the vehicle vertical direction and the side direction Q of the bush extends approximately in the vehicle lateral or widthwise direction. In the example shown in FIG. 6, the side direction Q of inboard connect bush 28 is set in the vehicle lateral direction whereas the side direction Q of outboard connect bush 27 is inclined by a predetermined angle β with respect to the vehicle lateral direction. In the front view of FIG. 3 in the standard vehicle body posture, the side direction Q of outboard connect bush 27 is rotated in the counterclockwise direction by the predetermined angle β which is equal to 30 degrees in this example.

Figure 7B:
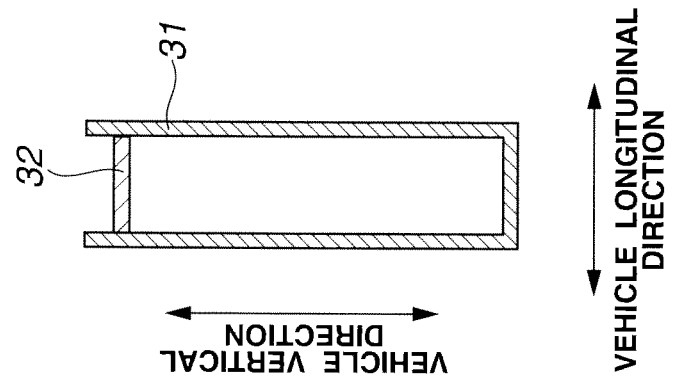
FIG. 7B is a sectional view of the lower front link.
Figure 7A:
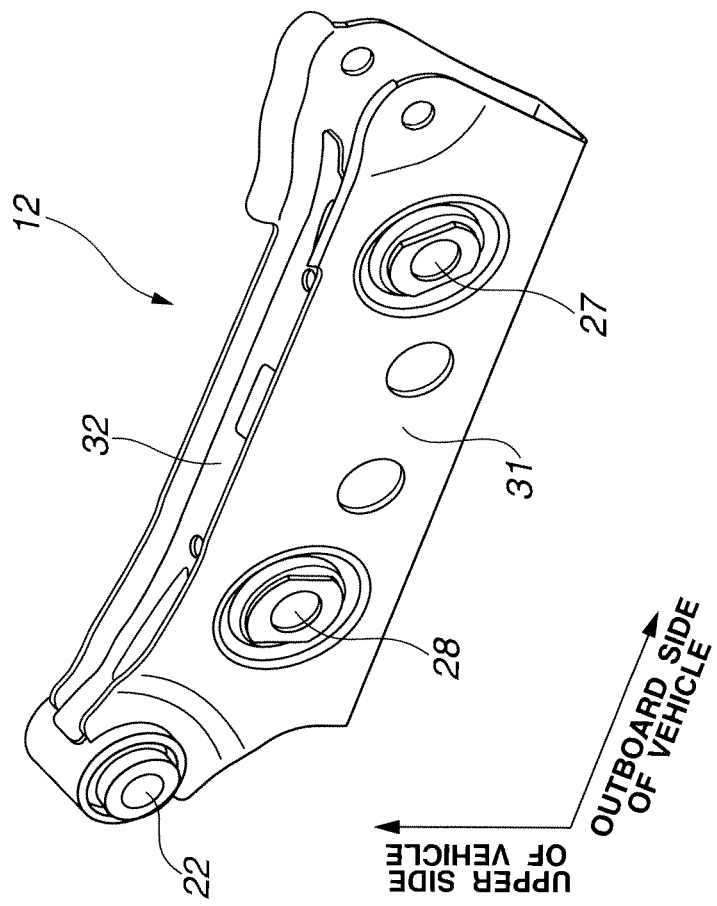
FIG. 7A is a perspective view of the lower front link.

FIG. 7 shows the construction of the lower front link. FIG. 7A is a perspective view of lower front link 12, and FIG. 7B is a sectional view of lower front link 12. Lower front link 12 has a hollow structure formed by a lower bracket 31 having a U-shaped section opening upwards, and an upper bracket 32 closing an upper portion of lower bracket 31.

FIG. 8 shows, in section, the connect bush connected with lower front link 12. FIG. 8A is a longitudinal sectional view of connect bush 27, and FIG. 8B is an enlarged sectional view showing a forward end 86 of outer cylinder 81 in a press fitting direction. Connect bush 27 is inserted forcibly into the lower front link 12 from the rear side (of the vehicle). Specifically, the outer cylinder 81 of connect bush 27 is forcibly fit in an engagement hole 29 of lower front link 12 from the rear side. The forward end 86 of outer cylinder 81 leading in the press-fitting direction is slightly bent radially inwards or slightly tapered and used as a guide for assisting insertion of connect bush 27 into the engagement hole 29 of lower front link 12.

<Operations>

FIG. 9 shows the lower front link and upper link in front elevation. FIG. 9A is a front view in the state of the standard vehicle body posture, and FIG. 9B is a front view in a full bound stroke state. In this example, the upper link 14 extends from an inboard end to an outboard end curvedly so that a central portion is bent downwards and an upper end is curved in a concave form so as to avoid interference with a side member (not shown) of the vehicle body extending above upper link 14. Therefore, the central portion of upper link 14 between the inboard and outboard ends is close to the lower front link 12. As a result, the upper link 14 could interfere with the lower front link 12 in dependence on the positions and shapes of both links 14 and 12, and might limit the suspension stroke quantity undesirably.

In the standard vehicle body posture, the connect bushes 27 and 28 are located below the outboard connection point (bush 21) of lower front link 12, as shown in FIG. 6. Specifically, connect bushes 27 and 28 are located below the (imaginary) straight line L1 connecting (the axis of) bush 21 and (the axis of) bush 22. With this arrangement, the lower front link 12 can be made in the form including a larger lower portion extending downwards in the widthwise direction of lower front link 12, below the imaginary line L1 and a smaller upper portion which projects upwards only slightly above line L1. Therefore, this arrangement can avoid interference between lower front link 12 and upper link 14 even in the full bound stroke state as shown in FIG. 9B, and ensure a sufficient amount of the suspension stroke.

FIG. 10 shows a comparative example. FIG. 10A is a front view in the state of the standard vehicle body posture, and FIG. 10B is a front view in the full bound stroke state. This comparative example employs a lower front link 20 having a shape different from the shape of lower front link 12, whereas the upper link 14 of the comparative example is identical in shape to the upper link of FIG. 9. The outboard connect bush 27 is disposed above the outboard connection point (bush 21)

of lower front link 20. Inboard connect bush 28 is located below the inboard connection point (bush 22) of lower front link 20.

With this arrangement, the lower front link 20 of the comparative example is so shaped as to project upwards. Consequently, the lower front link 20 might interfere with upper link 14 in the full bound stroke state as shown in. FIG. 10B. To avoid the interference, the stroke is limited in a narrower range.

Figure 11:
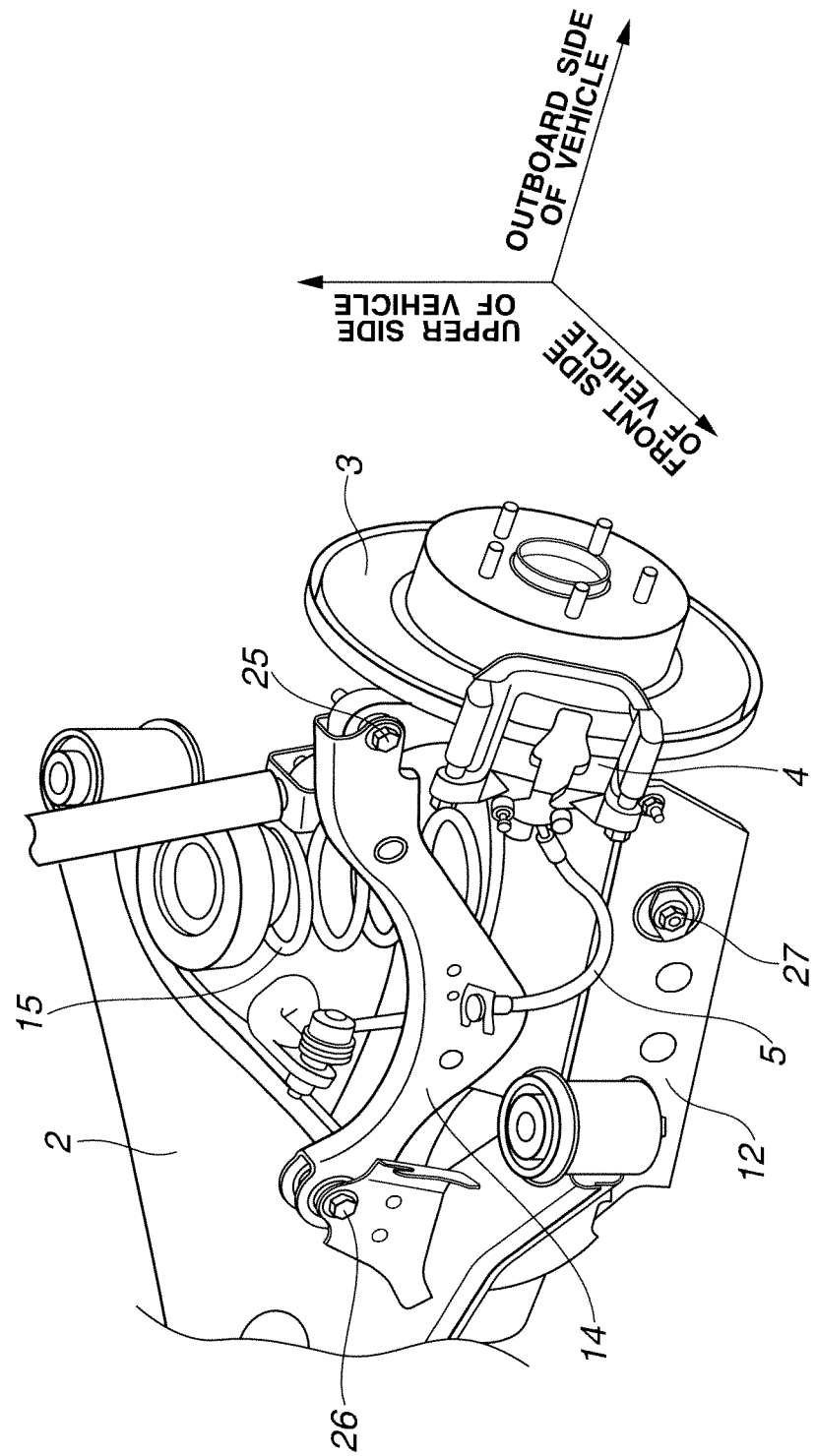
FIG. 11 is a perspective view schematically showing the suspension system.

FIG. 11 shows the suspension system schematically in perspective, to show a relationship between lower front link 12 and a brake hose. A brake caliper 4 for applying a braking force to a disc rotor 3 is connected through a brake hose 5, with a hydraulic circuit. The brake hose 5 is extended in the U-shaped form having upper segments located on an upper side of the lower front link 12 and a U-shaped lower segment located on a front side of lower front link 12.

FIG. 12 shows the positional relationship of the lower front link and the brake hose in the comparative example. FIG. 12A is a perspective view of the lower front link 20 as viewed approximately from above, and FIG. 12B is a perspective view of the lower front link 20 as viewed approximately from the front side. In the case of the comparative example, the lower front link 20 has the upper portion bulging upwards, and therefore, the connect bush 27 might interfere with the brake hose 4 during a suspension stroke movement.

FIG. 13 shows the positional relationship of the lower front link and the brake hose in the example according to the embodiment. FIG. 13A is a perspective view of the lower front link 12 as viewed approximately from above, and FIG. 13B is a perspective view of the lower front link 12 as viewed approximately from the front side. In the case of the lower front link 12 having the lower portion bulging downward below the line L1 connecting bushes 21 and 22. Therefore, this suspension structure can avoid interference between the connect bush 27 and brake hose 4 during a suspension stroke movement.

In the case of input of a lateral force, the suspension structure functions in the following manner. In the lower front link 12, the line L3 connecting the connect bushes 27 and 28 is located below the line L1 connecting the link bushes 21 and 22. Therefore, by shifting the line L3 connecting the connect bushes 27 and 28 closer to the tire ground contact point, the suspension structure can increase the lateral stiffness of the suspension structure because of the relationship of a couple of forces.

In the case of input of a longitudinal force, the suspension structure functions in the following manner. In the case of the comparative example, it is possible to obtain a toe-in change of wheel 1 at the time of input of a longitudinal force due to braking with the arrangement setting the connect bush 27 above the outboard connection point (bush 21) of lower front link 20. The second perpendicular direction Q of connect bush 27 is so set as to extend in the vehicle lateral direction.

In the lower front link 12 according to the embodiment, the connect bush 27 is located below the level of the outboard connection point (bush 21). Accordingly, it is not easy to secure a toe-in change of wheel 1 in response to a longitudinal force input during braking. Therefore, in the illustrated example of the embodiment, the second perpendicular direction Q of connect bush 27 is displaced by a predetermined angle ($\approx 30°$) with respect to the vehicle lateral direction (with respect to the line L1 or the line L3). With this arrangement, the suspension structure can secure the toe-in change of an amount comparable to the toe-in change in the comparative example, and thereby improve the stability.

It is possible to change the shape, the position and the number of each of component parts within the purview of the present invention. In this embodiment, at least one of connect bushes 27 and 28 corresponds to "bush".

≪Effects≫

(1) In the suspension structure according to the embodiment, the connect bush (27, 28) is located below the level of the front outboard connection point (bush 21) of the lower front link (12). Therefore, the lower front link can be made in the form including a larger lower portion extending downwards and a smaller upper portion which projects upwards only slightly. Therefore, this arrangement can avoid interference between lower front link 12 and upper link 14, and ensure a sufficient amount of the suspension stroke.

(2) In the suspension structure according to the embodiment, the connect bush (27, 28) is located below the (imaginary) straight line (L1) connecting the (front outboard) connection point (21) and the (front inboard) connection point (22). Therefore, the lower front link 12 can be made in the form including a larger lower portion extending downwards and a smaller upper portion which projects upwards only slightly. Therefore, this arrangement can avoid interference between lower front link 12 and upper link 14, and ensure a sufficient amount of the suspension stroke.

(3) In the suspension structure according to the embodiment, the lower front and rear links (12, 13) are connected by two of the connect bushes (27, 28), one being an inboard connect bush (28) and the other being an outboard connect bush (27) located on an outboard side of the inboard connect bush, and the inboard and outboard connect bushes (28, 27) are so arranged that the (imaginary) straight line (L3) connecting the position of the inboard connect bush (28) and the position of the outboard connect bush (27) is parallel to the straight line (L1) connecting the connection point between the lower front link and the wheel support member and the connection point between the lower front link and the vehicle body member in a front view of the vehicle body. With this parallel arrangement of the lines L1 and L3, the suspension structure can increase the lateral stiffness of the suspension.

(4) In the suspension structure according to the embodiment, the connect bush (27, 28) is so configured that the stiffness of the connect bush in a first perpendicular direction R perpendicular to the axis of the connect bush is lower than the stiffness of the connect bush in a second perpendicular direction Q perpendicular to the axis of the connect bush and perpendicular to the first perpendicular direction R. The connect bush or at least one of the connect bushes is disposed so that the second perpendicular direction Q of the connect bush is inclined with respect to the vehicle lateral direction by a predetermined angle ($\beta$) ($\approx 30°$, for example) in a standard vehicle body posture (having no suspension stroke). Therefore, the suspension structure can cause a toe-in change in the wheel 1 in the case of input of a longitudinal force due to braking, and thereby improve the stability during braking.

(5) In a suspension link arranging method according to the embodiment, the connect bush (27, 28) is located below the level of the front outboard connection point (bush 21) of the lower front link (12). Therefore, the lower front link 12 can be made in the form including a larger lower portion extending downwards and a smaller upper portion which projects upwards only slightly. Therefore, this arrangement can avoid interference between lower front link 12 and upper link 14, and ensure a sufficient amount of the suspension stroke.

≪Variation Examples≫

In the illustrated example according to the embodiment, the inner cylinder 71 is connected with the projecting or extending portion 16 of lower rear link 13, and the outer cylinder 81 is connected with lower front link 12. However, it is possible to employ an arrangement in which outer cylinder 81 is connected with the projecting portion 16 of lower rear link 13, and the inner cylinder 71 is connected with lower front link 12. This arrangement, too, can provide the same effects and operations.

In the illustrated example according to the embodiment, the lower front link 12 is in the form of a hollow structure formed by closing the upper end of lower bracket 31 with upper bracket 32. However, it is optional to employ the lower front link 12 having a different structure.

Figure 14B:
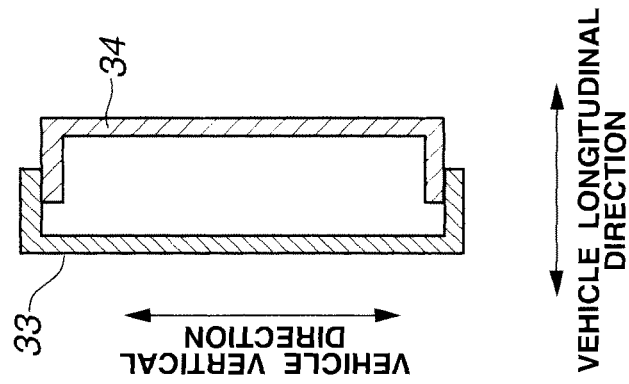
FIG. 14B is a sectional view.
Figure 14A:
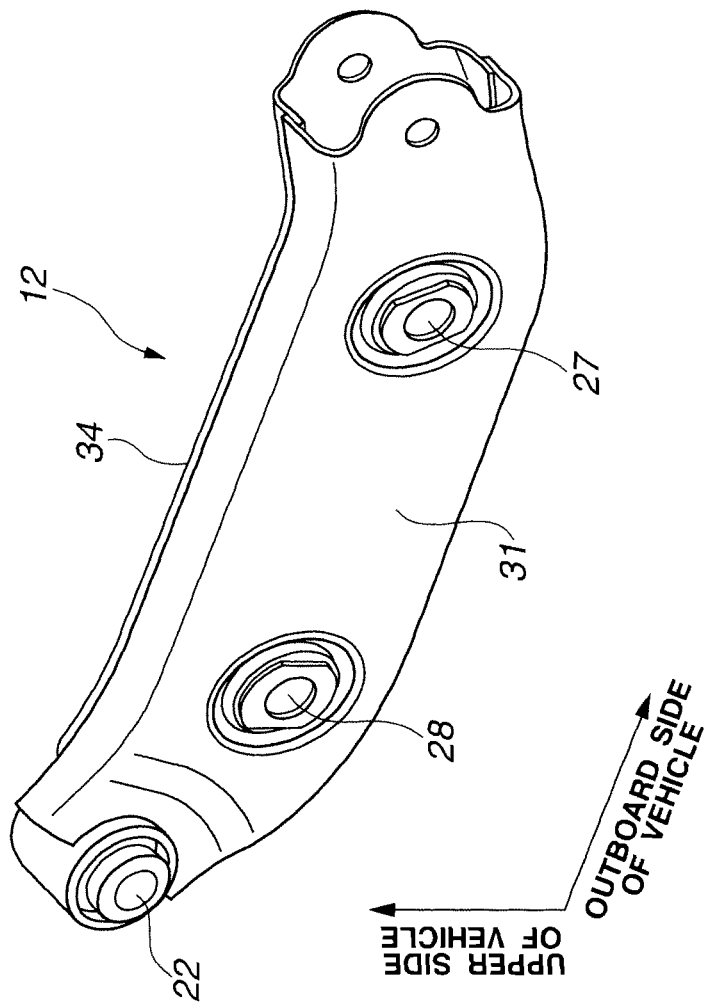
FIG. 14A is a perspective view of the lower front link.

FIG. 14 shows a variation example 1 of the lower front link 12. FIG. 14A is a perspective view of lower front link 12, and FIG. 14B is a sectional view. The lower front link 12 of this example has a hollow structure formed by joining a front bracket 33 and a rear bracket 34. Front and rear brackets 33 and 34 confront each other and extend side by side in the longitudinal direction of lower front link 12 from the inboard end to the outboard end. This example too can provide the same effects and operation as in the illustrated example of the embodiment.

FIG. 15 shows a variation example 2 of the lower front link 12. FIG. 15A is a perspective view of lower front link 12, and FIG. 15B is a sectional view. The lower front link 12 has a hollow structure having a rectangular cross section, formed by hydroforming. This example too can provide the same effects and operation as in the illustrated example of the embodiment.

Figure 16:
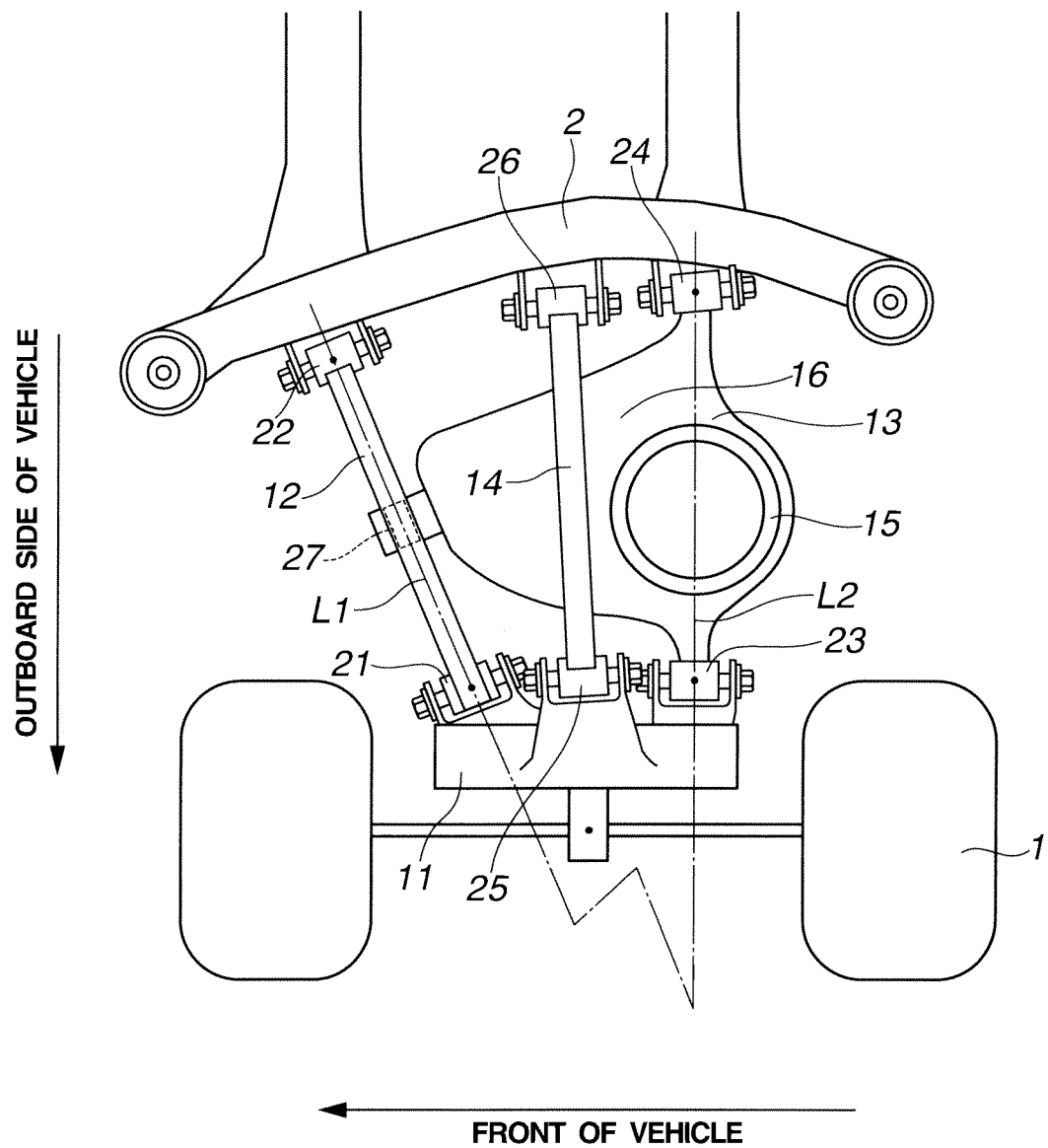
FIG. 16 a top view schematically showing a rear left wheel suspension system in a variation example according to the embodiment of the present invention.

Furthermore, although the lower front and rear links 12 and 13 are connected through two of the connect bushes 27 and 28 in the illustrated example, it is optional to connect the lower front and rear links 12 and 13 with only one connect bush (27) as shown in a variation example of FIG. 16. This variation example, too, can provide the same effects and operations.

As explained above, according to the embodiment, a suspension system or structure has a basic structure comprising: lower front and rear links arranged to connect a wheel support member adapted to support a wheel and a vehicle body member swingably; an upper link located above the lower front link and arranged to connect the wheel support member and the vehicle body swingably; and a connect bush arranged to connect the lower front link and the lower rear link with each other, the connect bush being located below (the level of) a (front outboard) connection point between the lower front link and the wheel support member.

The suspension system may further comprise any one or more of the following features (F1)~(F7). (F1) The connect bush is located below a (imaginary) straight line connecting the connection point between the lower front link and the wheel support member and a connection point between the lower front link and the vehicle body member. (F2) The suspension structure comprises two of the connect bushes, one being an inboard connect bush and the other being an outboard connect bush located on an outboard side of the inboard connect bush, the inboard and outboard connect bushes are both located below a (imaginary) straight line connecting the connection point between the lower front link and the wheel support member and a connection point between the lower front link and the vehicle body member. (F3) The inboard and outboard connect bushes are so arranged that a (imaginary) straight line connecting the position (of the axis) of the inboard connect bush and the position (of the axis) of the outboard connect bush is parallel to the (imaginary) straight line connecting the connection point between the lower front link and the wheel support member and the connection point between the lower front link and the vehicle body member.

(F4) The connect bush (27, 28) (or each connect bush or at least one of the connect bushes) includes: an inner cylinder (71) which extends in an axial direction (P) of the connect bush (the axial direction (P) is perpendicular to a link longitudinal direction (L1, L2) of one (12) of the front and rear suspension links (12, 13), for example), from a rear end to a front end located on the front side of the rear end of the inner cylinder in a front and rear direction (corresponding to the vehicle longitudinal direction) and which is connected with one (13) of the lower front and rear links (12, 13), an outer cylinder (81) which includes an inside circumferential surface confronting (radially) an outside circumferential surface of the inner cylinder and which is connected with the other of the lower front and rear links, and an elastic member interposed between the inner cylinder and the outer cylinder, the elastic member being so configured that a stiffness of the elastic member in a first perpendicular direction R (vertical direction) perpendicular to an axis of the connect bush is lower than a stiffness of the elastic member in a second perpendicular direction Q (side direction) perpendicular to the axis of the connect bush and perpendicular to the first perpendicular direction R. (F5) The connect bush is disposed so that the second perpendicular direction Q of the connect bush is inclined with respect to the vehicle lateral direction by a predetermined angle (β) in a standard vehicle body posture (having no suspension stroke). (F6) The connect bush is disposed so that the first perpendicular direction R of the connect bush is inclined with respect to a vertical direction by a predetermined angle (β) (or the connect bush is disposed so that the second perpendicular direction Q of the connect bush is inclined, by a predetermined angle (β), with respect to a (imaginary) straight line (L1) connecting the (front outboard) connection point (21) between the lower front link (12) and the wheel support member (11) and a (front inboard) connection point (22) between the lower front link (12) and the vehicle body member (2)) (F7) The suspension structure comprises two of the connect bushes, one being an inboard connect bush and the other being an outboard connect bush located on an outboard side of the inboard connect bush; and the outboard and inboard connect bushes are so arranged that the first perpendicular direction R of the outboard connect bush is inclined with respect to a vertical direction by a predetermined angle (β) whereas the first perpendicular direction R of the inboard connect bush is not inclined with respect to the vertical direction.

This application is based on a prior Japanese Patent Application No. 2011-109666 filed on May 16, 2011. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A suspension structure comprising:
a lower front link and a lower rear link that are configured to swingably connect a wheel support member and a vehicle body member, the wheel support member being a member configured to support a wheel;

an upper link located above the lower front link and configured to swingably connect the wheel support member and the vehicle body; and a connect bush configured to connect the lower front link and the lower rear link with each other, the connect bush being located below a connection point between the lower front link and the wheel support member, wherein the connect bush is located below a straight line connecting the connection point between the lower front link and the wheel support member and a connection point between the lower front link and the vehicle body member.

2. The suspension structure as claimed in claim 1, wherein:
the connect bush is an inboard connect bush, and the suspension structure further comprises an outboard connect bush located on an outboard side of the inboard connect bush, and
the inboard and outboard connect bushes are both located below the straight line connecting the connection point between the lower front link and the wheel support member and the connection point between the lower front link and the vehicle body member.

3. The suspension structure as claimed in claim 2, wherein the inboard and outboard connect bushes are arranged such that a straight line connecting a position of the inboard connect bush and a position of the outboard connect bush is parallel to the straight line connecting the connection point between the lower front link and the wheel support member and the connection point between the lower front link and the vehicle body member.

4. A suspension structure comprising:
a lower front link and a lower rear link that are configured to swingably connect a wheel support member and a vehicle body member, the wheel support member being a member configured to support a wheel;
an upper link located above the lower front link and configured to swingably connect the wheel support member and the vehicle body; and
a connect bush configured to connect the lower front link and the lower rear link with each other, the connect bush being located below a connection point between the lower front link and the wheel support member,
wherein the connect bush includes:
an inner cylinder which extends in an axial direction of the connect bush, from a rear end to a front end located on a front side of the rear end of the inner cylinder in a front and rear direction and which is connected with one of the lower front and lower rear links,
an outer cylinder which includes an inside circumferential surface confronting an outside circumferential surface of the inner cylinder and which is connected with the other of the lower front and lower rear links, and
an elastic member interposed between the inner cylinder and the outer cylinder, the elastic member being so configured that a stiffness of the elastic member in a first perpendicular direction (R) perpendicular to an axis of the connect bush is lower than a stiffness of the elastic member in a second perpendicular direction (Q) perpendicular to the axis of the connect bush and perpendicular to the first perpendicular direction (R), and
wherein the connect bush is disposed so that the second perpendicular direction (Q) of the connect bush is inclined with respect to a vehicle lateral direction by a predetermined angle in a standard vehicle body posture.

5. A suspension structure comprising:
a lower front link and a lower rear link that are configured to swingably connect a wheel support member and a vehicle body member, the wheel support member being a member configured to support a wheel;
an upper link located above the lower front link and configured to swingably connect the wheel support member and the vehicle body; and
a connect bush configured to connect the lower front link and the lower rear link with each other, the connect bush being located below a connection point between the lower front link and the wheel support member,
wherein the connect bush includes:
an inner cylinder which extends in an axial direction of the connect bush, from a rear end to a front end located on a front side of the rear end of the inner cylinder in a front and rear direction and which is connected with one of the lower front and lower rear links,
an outer cylinder which includes an inside circumferential surface confronting an outside circumferential surface of the inner cylinder and which is connected with the other of the lower front and lower rear links, and
an elastic member interposed between the inner cylinder and the outer cylinder, the elastic member being so configured that a stiffness of the elastic member in a first perpendicular direction (R) perpendicular to an axis of the connect bush is lower than a stiffness of the elastic member in a second perpendicular direction (Q) perpendicular to the axis of the connect bush and perpendicular to the first perpendicular direction (R), and
wherein the connect bush is disposed so that the first perpendicular direction (R) of the connect bush is inclined with respect to a vertical direction by a predetermined angle.

6. A suspension structure comprising:
a lower front link and a lower rear link that are configured to swingably connect a wheel support member and a vehicle body member, the wheel support member being a member configured to support a wheel;
an upper link located above the lower front link and configured to swingably connect the wheel support member and the vehicle body;
an inboard connect bush configured to connect the lower front link and the lower rear link with each other, the inboard connect bush being located below a connection point between the lower front link and the wheel support member; and
an outboard connect bush located on an outboard side of the inboard connect bush,
wherein each of the inboard connect bush and the outboard connect bush includes:
an inner cylinder which extends in an axial direction of the connect bush, from a rear end to a front end located on a front side of the rear end of the inner cylinder in a front and rear direction and which is connected with one of the lower front and lower rear links,
an outer cylinder which includes an inside circumferential surface confronting an outside circumferential surface of the inner cylinder and which is connected with the other of the lower front and lower rear links, and
an elastic member interposed between the inner cylinder and the outer cylinder, the elastic member being so configured that a stiffness of the elastic member in a first perpendicular direction (R) perpendicular to an axis of the connect bush is lower than a stiffness of the elastic member in a second perpendicular direction (Q) perpendicular to the axis of the connect bush and perpendicular to the first perpendicular direction (R), and wherein the outboard and inboard connect bushes are so arranged that the first perpendicular direction (R) of the outboard connect bush is inclined with respect to a vertical direction by a predetermined angle whereas the first perpendicular direction (R) of the inboard connect bush is not inclined with respect to the vertical direction.

7. A suspension link arranging method comprising:

swingably connecting a wheel support member and a vehicle body member via a lower front link and a lower rear link, the wheel support member being configured to support a wheel;

swingably connecting the wheel support member and the vehicle body member via an upper link located above the lower front link; and connecting the lower front link and the lower rear link via a connect bush located below a connection point between the lower front link and the wheel support member, wherein the connect bush is located below a straight line connecting the connection point between the lower front link and the wheel support member and a connection point between the lower front link and the vehicle body member.

* * * * *